United States Patent [19]

Kamis et al.

[11] Patent Number: 4,888,380

[45] Date of Patent: Dec. 19, 1989

[54] CLEAR, NON-SLUMPING SILICONE SEALANTS

[75] Inventors: Russell P. Kamis, Bay County; Jerome M. Klosowski, Bay City; Loren D. Lower, Midland, all of Mich.

[73] Assignee: Dow Corning Corporation, Midland, Mich.

[21] Appl. No.: 249,734

[22] Filed: Sep. 26, 1988

[51] Int. Cl.$^4$ ............................................. C08L 83/00
[52] U.S. Cl. ..................................... 524/588; 524/413; 524/425; 524/431; 524/783; 524/788; 524/860; 524/863; 528/17; 528/35
[58] Field of Search ................... 528/17, 35; 524/860, 524/863, 783, 788, 588, 431, 413, 425

[56] References Cited

U.S. PATENT DOCUMENTS

| | | | |
|---|---|---|---|
| 3,294,739 | 12/1966 | Weyenberg | 528/17 |
| 3,334,067 | 8/1967 | Weyenberg | 528/17 |
| 3,856,839 | 12/1974 | Smith et al. | 260/429.5 |
| 4,143,088 | 3/1979 | Favre et al. | 260/825 |
| 4,652,624 | 3/1987 | Allen et al. | 528/35 |
| 4,687,829 | 8/1987 | Chaffie et al. | 528/17 |
| 4,711,928 | 12/1987 | Lee et al. | 524/860 |

*Primary Examiner*—Melvyn I. Marquis
*Attorney, Agent, or Firm*—Edward C. Elliott

[57] ABSTRACT

A process for producing a silicone sealant which is stable in the absence of moisture and having a slump of less than 1 inch mixes a polydiorganosiloxane polymer having hydroxyl or alkoxysilethylene endblocking, an alkoxysilane crosslinker, and a titanium catalyst; then adds a reinforcing filler.

10 Claims, No Drawings

CLEAR, NON-SLUMPING SILICONE SEALANTS

BACKGROUND OF THE INVENTION

Field of the Invention

This invention relates to neutral curing silicone sealants which cure upon exposure to moisture at room temperature.

BACKGROUND INFORMATION

Silicone sealants which cure through a neutral reaction are known in the art. Examples can be found in U.S. Pat. No. 3,856,839, issued Dec. 24, 1974, disclosing alkanedioxy titanium chelates which catalyze the cure of a composition which also contains methyltrimethoxysilane and a silanol chain-stopped polydiorganosiloxane fluid; and U.S. Pat. No. 4,143,088, issued Mar. 6, 1985, disclosing use of alkoxylated organosilicon compoumds consisting of either monomers or polymers having difunctional, trifunctional, or tetrafunctional molecules, comprising at most 40 percent of difunctional monomers in an organosilicon composition which is storage stable in the absence of moisture and is rapidly curable into elastomers with selfadherent properties in the presence of water at room temperature.

The sealants such as described in these references have a tendency to require a longer time to cure as they shelf age. In some cases, the sealant arrives at a point where it no longer cures upon exposure to moisture. This is particularly serious, because the user does not realize the problem until after the sealant is put into place. To correct the problem, all of the uncured sealant must be removed and replaced, a very time consuming and expensive undertaking.

A method of improving the storage stability is shown in U.S. Pat. No. 4,687,829, issued Aug. 18, 1987. An improved sealant is produced by mixing alkoxy functional polydiorganosiloxane having alkoxysilethylene ends with a combination of trifunctional or tetrafunctional silane crosslinker and difunctional silane chain extender. A method of producing such a sealant having an in situ treated filler is taught in U.S. Pat. No. 4,711,928, issued Dec. 8, 1987.

Sealants produced having the imrpoved shelf life can have a problem in that the viscosity or consistency of the finished uncured dealant is such that when the sealant is extruded from the storage tube into the space to be sealed, the sealant flows under the force of gravity. If the space to be sealed is horizontal, this may be no problem, but if the space is vertical, the sealant may flow out of place.

This invention is a method of mixing the ingredients so that the resulting sealant is not a flowable material, but remains in place when extreuded form its storage tube.

SUMMARY OF THE INVENTION

The method of this invention prepares a sealant by mixing in the absence of moisture an alkoxysilethylene endblocked polydiorganosiloxane, di or tri functional alkoxysilane, and titanium caatalyst, then admixing a reinforcing filler.

DESCRIPTION OF THE INVENTION

This invention is a process of producing silicone sealants containing polydiorganosiloxane having alkoxy endblocking, alkoxy functional crosslinker and/or chain extender, and titanium catalyst, wherein the improvement comprises a process comprising (A) mixing in the absence of moisture (1) 100 parts by weight of a polymer of the formula

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each D is selected from the group consisting of hydroxyl radical and radical of the formula

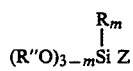

where each R" is at least one selected form the group consisting of methyl, ethyl, propyl, and butyl, Z is a divalent hydrocarbon radial or a combination of divalent hydrocarbon radicals and siloxane radicals, m is 0 or 1, and x is of a value such that the polymer has a viscosity of from 0.5 to 3000 Pa.s at 25° C.; (2) from 0.1 to 14 parts by weight of an alkoxysilane of the formula

where R' is at least one selected from the group consisting of methyl, ethyl, propyl, phenyl, and vinyl, R" is as defined above, and a is 0, 1 or 2; and (3) from 0.2 to 6.0 parts by weight of titanium catalyst; and (B) adding after the above are mixed, (4) from 5 to 60 parts by weight of reinforcing filler; then (C) storing the mixture in the absence of moisture, to give a sealant which is stable in the absence of moisture and has a slup of less than 1 inch when measured in accordance with ASTM D 2202.

The method of this invention uses a polymer of the formula

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each D is selected from the group consisting of hydroxyl radical and radical of the formula

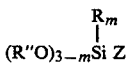

where each R" is at least one selected from the group consisting of methyl, ethyl, propyl, and butyl, Z is a divalent hydrocarbon radical or a combination of divalent hydrocarbon radicals and siloxane radicals, m is 0 to 1, and x is of a value such that the polymer has a viscosity of from 0.5 to 3000 Pa.s at 25° C.

When D of the above polymer (1) is hydroxyl, the polymer is the well known hydroxyl endblocked polydiorganosiloxane commonly used in the production of siloxane sealants. The polymer is well known in the art and its description and method of manufacture are also well known and need no further description.

When D of the above polymer (1) is alkoxy silane, the polymer is of the formula

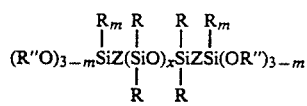

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each R" is at least one selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon aroms in the form of a divalent alkylene or arylene radical such as ethylene, propylene, hexylene, phenylene, and

A preferred Z may be represented by the formula

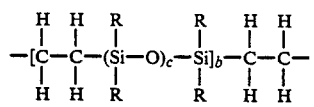

where R is as defined above, b is 0 or 1, and c is from 1 to 6. The preferred viscosity of polymer (1) is from 1 to 1000 Pa.s at 25° C. Lower viscosities give cured sealants which are very hard with high modulus because of the high amount of crosslinking while higher viscosities give sealants with a very low extrusion rate.

A preferred polymer is represented by the formula where R and R" are as defined above, m is 0 to 1, b is 0 or 1, c is from 1 to 6 and x is such that the viscosity is from 0.5 to 3000 Pa.s at 25° C.

A preferred polymer, obtained when b is 0, is of the formula

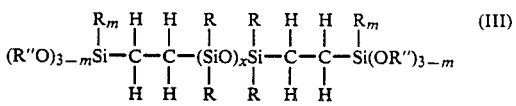

or, when b is 1 and c is 1, is of the formula

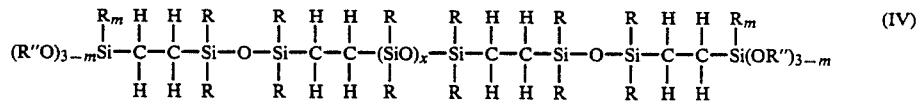

where R and R" are as described above. Methyl radical is preferred for R and R". The radicals can be the same or combinations of the above whee at least 50 mole percent of the radicals are methyl radicals.

The polymer of formula (II) can be manufactured by reacting a vinyl endblocked polydiorganosiloxane with an endcapping composition of the formula

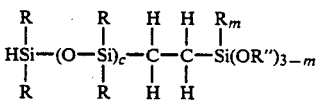

where R and R" are as defined above, m is 0 or 1, and c is 1 to 6. This endcapping composition can be produced by a method comprising (A) mixing 1 mole of a composition (a) of the formula

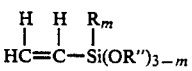

where R, R", and m are as defined above, with greater than 2 moles of a composition (b) of the formula

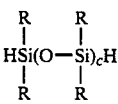

where R is as defined above and c is from 1 to 6, in the presence of a platinum catalyst and allowing to react, then, (B) optionally stripping the excess composition (b) from the product, to give an endcapping composition of the formula as given above. When c is equal to 1, the product obtained is the endcapping composition shown above which is used to produce the polymer of formula (IV). A preferred endcapping composition is that obtained when c is equal to 1 and m is equal to 0. The above endcapping composition, its method of manufacture, and its use in the manufacture of silicone sealants, having an alkoxy functional silane crosslinker and a titanium catalyst, is taught in U.S. Pat. Appn. 148,196, filed Jan. 28, 1988, now Patent No. 4,772,675, assigned

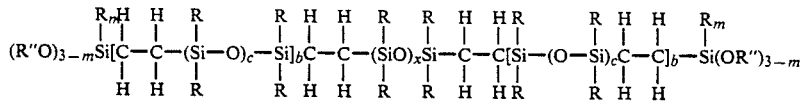

to the assignee of the instant application, which is hereby incorporated by reference to show the endcapping composition, its manufacture, and its use.

The polymer of formula (III) may be produced by reacting a hydrogen endblocked polydiorganosiloxane with a silane of the formula

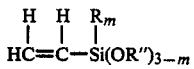

in the presence of a platinum catalyst such as clhoroplatinic acid at a temperature of from 30° to 150° C. Methods of making these polymers are taught in U.S. Pat. No. 3,175,993, issued Mar. 30, 1965, to Weyenberg, which is hereby incorporated by reference to show methods of manufacturing polymer of formula (III).

The polymer of formula (IV) can be manufactured by reacting a vinyl endblocked polydiorganosiloxane with an endcapping composition of the formula

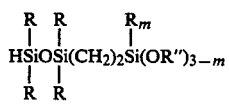

where R is as defined above, using a platinum catalyst to cause the materials to react. This endcapping composition is prepared by the reacting $ViR_mSi(OR'')_{3-m}$, where Vi is vinyl radical, with $(R_2HSi)_2O$ in the presence of a platinum catalyst where only one end of the disilane is reacted. This can be done by combining 1 mole of the $ViR_mSi(OR'')_{3-m}$ with greater than 2 moles of the disilane. When this mixture is combined with a platinum catalyst, there is a slightly exothermic reaction after a few minutes at room temperature. The color changes from clear to light yellow. A byproduct will be present consisting of product produced by the reaction of $ViR_mSi(OR'')_{3-m}$ to both ends of the silane. This byproduct can be left in the material. At a 1 to 2 ratio, there is about 15 percent byproduct produced. If the ratio is changed to 1 to 4 the byproduct drops to about 5 percent. The excess silane is then stripped from the product. The product can be purified by distillation if desired.

A series of polymers silimar to those shown above as polymers II, III, and IV can be produced where not all of the vinyl endblocking groups on the polydiorganosiloxane are reacted with an alkoxysilane. A polymer results in which, on average, some of the ends are vinyl endblocked and some of the ends are alkoxysilethylene endblocked. Useful materials have been produced in which on average from 3 to 40 percent of the endblocking groups are vinyl radicals and the remainder are alkoxysilethylene radicals. AS an example, when the endcapping composition is of the formula

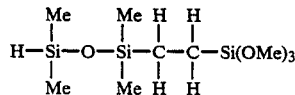

where Me is methyl radical and the vinyl endblocked polydiorganosiloxane is a polydimethylsiloxane having a viscosity of about 55 Pa.s at 25° C. then the degree of endblocking versus the amount of endcapping composition used can be estimated from the following:

| Parts by Weight of Endcapper | Percent of Alkoxysilethylene Endblocks |
| --- | --- |
| 0.9 | 100 |
| 0.8 | 89 |
| 0.7 | 78 |
| 0.6 | 67 |
| 0.5 | 55 |

When these polymers having a portion of the endblocking present as vinyl radicals are formulated into moisture curing sealants, the modulus of the cured sealant is lower than if all of the endblocking groups were alkoxysilethylene groups. By adjusting the degree of endcapping, the modulus of the resulting elastomer can be controlled at the desired level.

The above polymers can also be produced by using similar siloxanes and silanes in which the location of the hydrogen atom and the vinyl group which react together are reversed.

Useful silicone elastomeric sealants are commonly produced with a filler as one of the ingredients. These fillers are well known in the industry. They are added to the mixture to provide reinforcement of the polymer so as to control the physical properties of the sealant after curing. Reinforcing fillers (ingredient 4), such as fumed silica, precipitated silica, and diatomacious earth are used to give the highest physical strengths to the sealants. Reinforcing fillers are generally recognized as being very fine particles having a surface area from about 50 to 700 $m^2/g$. These fillers may be used with untreated filler surfaces or with treated filler surfaces, the treatment being used to modify the filler surface so that it properly reacts with the polymer and the other ingredients in the sealant. Calcium carbonate fillers are now available which are produced by precipitation which have a surface area of about 20 $m^2/g$ that give a reinforcing effect also. Extending fillers such as titanium dioxide, zirconium silicate, calcium carbonate, iron oxide, ground quartz, and carbon black may be used. The amounts of filler used can obviously be varied within wide limits in accordance with the intended use. For example, in some cases the sealant could be used with no filler, but it would have very low physical properties. Reinforcing fillers are commonly used in amounts from about 5 to 60 parts by weight to give the highest physica. properties, suchas tensile strength. Extending fillers are finely ground in that the average particle size is in the range of from about 1 to 10 micrometers. Extending fillers are used to modify the sealant properties and to provide opacity in some cases.

An alkoxysilane (2) of the formula $R'_aSi(OR'')_{4-a}$ where R'is at least one selected from the group consisting of methyl, ethyl, propyl, phenyl, and vinyl, R" is as defined above, and a is 0, 1, or 2, is added as a moisture scavenger and as a modulus control agent. These alkoxy silanes and their method of manufacture are well known. The amount of alkoxysilane preferably is from 0.1 to 14 parts by weight, with from 2 to 8 parts most preferred. When a is 2, the silane is a chain extender; in this case it is preferable that the polymer (1) be trialkoxy endblocked, so that crosslinking as well as chain extension takes place. It is possible to produce useful sealants without using a crosslinker when the polymer of this invention is present because of the functionality of the polymer itself, but from a practical viewpoint, the alkoxysilane is useful in that it contributes to the excellent shelf life of the sealant. It is also useful in controlling the degree of crosslinking in the cured elastomeric sealant; more of the trifunctional crosslinker results in a harder, lower elongation elastomer, while more of the difunctional silane acts as a chain extender to give a softer, higher elongation elastomer.

The sealants of this invention are cured throug the use of a titanium catalyst (3). The titanium catalyst can be any of those known to be useful in catalyzing the moisture induced reaction of alkoxy containing siloxanes or silanes. Preferred are a titanium catalyst such as titanium naphthenate, titanium esters suchas tetrabutyltitanate, tetra-2-ethylhexyltitanate, tetraphenyltitanate, triethanolaminetitanate, organosiloxytitanium compounds such as those described in U.S. Pat No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, bis-(acetylacetonyl)-diisopropyltitanate, and 2,5-di-isoproppxy-bis-ethylacetoacetate titanium. The amount of catalyst is from 0.2 to 6.0 parts by weight per 100 parts by weight of polymer (1). Preferred are from 0.5 to 3.0 parts by weight.

The method of this invention is used to produce an improved silicone elastomeric sealant, having a reduced tendency to flow and an increased cure rate. The preferred method mixes the alkoxysilethylene ended polymer (1) with a deaired mixture of crosslinker (2), and titanium catalyst (3), which are added in the absence of exposure to moisture. The crosslinker (2) and titanium catalyst (3) can be added separately or they can be mixed together and then added as a mixture. They are thoroughly stirred to give a uniform mixture. Then the reinforcing filler is added in the absence of moisture and stirred until uniform. The uniform mixture is then preferably deaired, then sealed into storage containers, sealant tubes for example, to store it until it is to be used.

the composition produced by the method of this invention has less tendency to flow when compared to comparable compositions made with conventional mixing methods. When the composition produced by the method of this invention is exposed to moisture, it cures to give an elastomeric silicone. The composition is useful as a sealant material for filling spaces and gaps as in sealing buildings particularly where the spaces and gaps are in a vertical plane.

The following examples are included for illustrative purposes only and should not be construed as limiting the invention which is properly set forth in the appended claims. All parts are parts by weight.

POLYMER PREPARATION

A polydiorganosiloxane having endblocking of trialkoxysilethylene was prepared by mixing 100 parts of dimethylvinylsiloxy endblocked polydimethylsiloxane having a viscosity of aobut 55 Pa.s at 25° C. with 0.8 part of a tetramethyldisilane in which one of the hydrogen atoms is replaced with a trimethoxysilethylene group, the silane having the formula

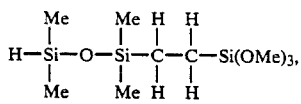

and 0.01 part of chloroplatinic acid complex of divinyltetramethyldisiloxane diluted with dimethylvinylsiloxy endblocked polydimethylsiloxane to provide 0.7 weight percent platinum and allowing the mixture to react to give a polydiorganosiloxane having the above described endblocking group. This polymer is referred to as polymer A in the examples.

In an analogous procedure, 100 parts of the polydimethylsiloxane was reacted with 1.04 parts of a dimethoxysilethylene hydride, rather than the trimethoxy shown above as (V). This polymer was completely endblocked with dimethoxysilethylene groups. This polymer is referred to as polymer B in the examples.

Polymer C was prepared in the same manner as polymer A, except the reactancts were 100 parts of the dimethylvinylsiloxy endblocked polydimethylsiloxane and 0.7 parts of the tetramethyldisilane (V) to give a polymer having about 80 percent of the polymer ends blocked with trimethoxysilethylene and 20 percent with vinyl groups.

EXAMPLE 1

A comparison of the prior art method of mixing and the method of mixing of this invention was made.

A comparative base was prepared by mixing 100 parts of polymer A and 10 parts of fumed silica having a surface area of about 250 m$^2$/g until uniform, putting in a container and exposing to vacuum to remove the air. Then this base was further mixed by adding, in the absence of moisture, 4 parts of methyltrimethoxysilane and 1.5 parts of tetrabutyltitanate. After storage for 18 hours at 50° C. (an accelerated storage test), the sealant was tested for suitability for use in vertical joints by measuring the slump in accordance with ASTM D 2202. The slump was greater than 4 inches, showing that the sealant was very flowable.

A composition was prepared in accordance with this invention by mixing 100 parts of polymer A, 4 parts of methyltrimethoxysilane, and 1.5 parts of tetrabutyltitanate in the absence of moisture until uniform. Then 10 parts of the above described silica was admixed, wtihout exposure to moisture. After storage for 18 hours, the sealant was tested as above. The slump was 0.7 inches, showing the sealant had a greatly reduced amount of flow. Both compositions were of the same formulation, only the method of compounding the compositions was different.

EXAMPLE 2

A comparative composition was prepared by mixing 100 parts of polymer B, 4 parts of dimethyldimethoxysilane, and 10 parts of the above fumed silica until uniform, in the absence of moisture. Then 2 parts of tetrabutyltitanate were admixed in the absence of moisture until uniform. After storage overnight, the sealant was tested as above. The slump was greater than 4 inches, showing that the sealant was very flowable.

a composition was prepared in accordance with this invention by mixing 100 parts of polymer B, 4 parts of dimethyldimethoxysilane, and 1 part of tetrabutyltitanate, in the absence of moisture, until uniform. Then 10 parts of the above fumed silica was admixed, wtihout exposure to moisture. Finally another 1 parts of tetrabutyltitanate was added. After storage, the sealant was tested as above. The slump was 0.8 inches.

A composition was prepared in accordance with this invention by mixing 100 parts of polymer B, 4 parts of dimethyldimethoxysilane, and 2 parts of tetrabutylitanate, in the absence of moisture, until uniform. Then 10 parts of the above fumed silica was admixed, without exposure to moisture. After storage, the sealant was tested as above. The slump was 0.2 inches.

EXAMPLE 3

A comparative composition was prepared by mixing 100 parts of polymer B, 3 parts of methyltrimethoxysilane, and 10 parts of the above fumed silica until uniform, in the absence of moisture. Then 2 parts of tetrapropyltitanate were admixed in the absence of moisture until uniform. After storage overnight, the sealant was tested as above. The slump was 2.7 inches, showing that the sealant was flowable.

A composition was prepared in accordance with this invention by mixing 100 parts of polymer B, 3 parts of methyltrimethoxysilane, and 1 part of tetrapropyltitantate, in the absence of maisture, until uniform. Then 10 parts of the above fumed silica was admixed, wtihout exposure to moisture. Finally another 1 parts of tetrapropyltitantate was added. After storage the sealant was tested as above, giving a slump of 0.15 inches.

EXAMPLE 4

A comparative composition was prepared by mixing 100 parts of polymer C with 8 parts of fumed silica having a surface area of about 150 m²/g and then putting in a container and deairing. Then 7 parts of methyltrimethoxysilane and 2 parts of chelated titanate catalyst, 2,5-di-isopropoxy-bis-ethylacetoacetate titanium, were admixed in the absence of moisture. The slump, skin over time (SOT), and tack free time (TFT) of the sealant were measured with the results shown in Table I.

The skin over time is defined as the time required for the material to cure to the point where it no longer adheres to a clean fingertip lightly applied to the surface. The cure conditions are 23° C. and 50 percent relative humidity.

The tack free tine is defined as the time in minutes required for a curing material to form a non-tacky surface film. A sample is spread on a clean smooth surface and timing is begun. Periodically, a clean strip of polyethylene film is laid upon a fresh surface and a one ounce weight applied to it. After 4 seconds, the weight is removed and the strip gently pulled off. The time when the strip pulls cleanly away from the sample is recorded as the tack free time.

A composition of this invention was prepared by mixing 100 parts of polymer C with 7 parts of methyltrimethoxysilane and 2 parts of the above chelated titanate catalyst, in the absence of moisture. Then 8 parts of the above fumed silica was admixed in the absence of moisture. The slump, skin over time (SOT), and tack free time (TFT) of the sealant were measured with the results shown in Table 1.

TABLE I

| Sample | Slump inches | SOT min | TFT min |
|---|---|---|---|
| Tested after preparation | | | |
| Comparative | 1.45 | 18 | 50 |
| Invention | 0.10 | 10 | 35 |
| Tested after 1 day storage at 50° C. | | | |
| Comparative | 1.71 | 12 | 64 |
| Tested after 3 days storage at 50° C. | | | |
| Invention | 0.10 | 15 | 35 |

The composition of this invention has a lower slump and a much faster cure rate that the comparative composition having the same formulation but made in the conventional mixing manner rather than by the method of this invention.

That which is claimed is:

1. A process of producing silicone sealants containing polydiorganosiloxane having alkoxy endblocking, alkoxy functional crosslinker and/or chain extender, and titanium catalyst, wherein the improvement comprises a method comprising
    (A) mixing in the absence of moisture
        (1) 100 parts by weight of a polymer of the formula

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each D is selected from the group consisting of hydroxyl radical and radical of the formula

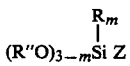

where each R" is at least one selected from the group consisting of methyl, ethyl, propyl, and butyl, Z is a divalent hydrocarbon radical or a combination of divalent hydrocarbon radicals and siloxane radicals, m is 0 or 1, and x is of a value such that the polymer has a viscosity of from 0.5 to 3000 Pa.s at 25° C.,
        (2) from 0.1 to 14 parts by weight of a alkoxysilane of the formula

where R' is at least one selected from the group consisting of methyl, ethyl, propyl, phenyl, and vinyl, R" is as defined above, and a is 0, 1 or 2, and
        (3) from 0.2 to 6.0 parts by weight of titanium catalyst, and
    (B) adding after the above are mixed,
        (4) from 5 to 60 parts by weight of reinforcing filler, then
    (C) storing the mixture in the absence of moisture,
to give a sealant which is stable in the absence of moisture and has a slump of less than 1 inch when measured in accordance with ASTM D 2202.

2. The method of claim 1 in which polymer (1) is that in which D is hydroxyl radical.

3. The method of claim 1 in which polymer (1) is that in which D is a radical of the formula

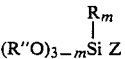

where each R" is at least one selected from the group consisting of methyl, ethyl, propyl, and butyl, Z is a divalent hydrocarbon radical or a combination of divalent hydrocarbon radicals and siloxane radicals, and m is 0 or 1.

4. The method of claim 3 in which the reinforcing filler is from 5 to 15 parts by weight of fumed silica.

5. The method of claim 4 in which polymer (1) has m equal to O, Z is of the formula

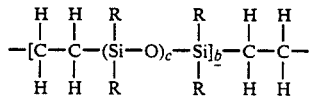

where b equal to 1, c equal to 1, R and R″ are methyl radicals, and there is from 2 to 8 parts by weight of crosslinker (2) in which a is equal to 2.

6. The method of claim 5 in which titanate (3) is tetrabutyltitanate.

7. The method of claim 5 in which titanate (3) is 2,5-di-isopropoxy-bis-ethylacetoacetate titanium.

8. The sealant produced by the method of claim 1.

9. The sealant produced by the method of claim 6.

10. The sealant produced by the method of claim 7.

* * * * *